United States Patent Office 2,976,277
Patented Mar. 21, 1961

2,976,277
METHOD OF PREPARING CELLULOSE ESTERS

George P. Touey and John W. Tamblyn, Kingsport, Tenn., assignors to Eastman Kodak Company, Rochester, N.Y., a corporation of New Jersey No Drawing. Filed Apr. 9, 1959, Ser. No. 805,130

5 Claims. (Cl. 260—227)

This invention relates to the use of titanium compounds as catalysts in the preparation of organic acid esters of polysaccharides. In particular, it relates to the use of titanium salts, esters, alkoxides, and hydroxides as catalysts in the preparation of substantially undegraded organic acid esters of cellulose.

The preparation of cellulose esters is well known in the prior art. It usually involves the reaction of cellulose with an organic acid anhydride in the presence of strong acid catalysts such as sulfuric acid, hydrochloric acid, phosphoric acid, perchloric acid and the like. Diluents such as aliphatic acids and halogenated and unhalogenated hydrocarbons are also employed. Although strong mineral acids are effective catalysts for the esterification of cellulose, they are highly corrosive on metal equipment and they degrade the cellulose due to their ability to cleave the glycosidic linkages of the polymer. When strong acids are used as cellulose esterification catalysts, there are two competing reactions taking place, the esterification of the hydroxyl group of the cellulose by the acid anhydride and the degradation of the polymer due to the presence of the strong acid. In addition, when strong mineral acids are employed as cellulose esterification catalysts, products soluble in acetone are not obtained directly. Thus, for example, in the preparation of cellulose acetate by employing the conventional catalysts a cellulose triacetate must first be formed. This product must then be carefully hydrolyzed to a cellulose acetate containing a small proportion of unesterified hydroxyl groups before it is acetone-soluble.

In commercial practice, sulfuric acid is used to catalyze the esterification of cellulose. In this case the sulfuric acid not only degrades the cellulose during the reaction but it also reacts with it producing combined acid sulfate groups in the product. These acid sulfate groups interfere with the heat stability of the product and, therefore, they must be removed by an additional hydrolysis step or by neutralization with a strong metal ion such as Na or Mg. The hydrolysis step is a tedious procedure, and the neutralization step produces products which do not exhibit good solubility in organic solvents due to the presence of the metal sulfate groups.

Few methods are known which esterify cellulose with organic acids without the use of strong mineral acid catalysts. It is well known that cellulose can be esterified by treatment with an acid chloride or anhydride in the presence of a tertiary amine. Such a method, however, requires many hours of reaction time at elevated temperatures. For example, the pyridine-acetic anhydride system requires several weeks for the complete acetylation of cellulose according to Hess and Ljubitsch (Ber., 61B: 1460–1462, 1928).

The use of metal salts of strong acids such as zinc chloride are also well known promoters for the esterification of cellulose. However, these salts are inoperative when used in the amounts normally recognized as catalytic amounts. Zinc chloride, for example, must be employed at a concentration equal to one-half the weight of the cellulose before it is capable of producing a highly acetylated product from cellulose and acetic anhydride. Also, strong acid salts are still capable of degrading the cellulose because, in effect, they function as a strong acid. In addition, it is a well known fact that salts of strong mineral acids have a highly corrosive action on the metal equipment commercially employed in making cellulose esters.

U.S. Patent No. 1,930,895 discloses that potassium acetate, a basic salt, is a promoter for preparing esters from cellulose and aliphatic acid anhydrides without degrading the cellulose. However, the patent claims an insoluble cellulose ester and the amounts of potassium acetate which must be employed are far above what are considered as catalytic amounts.

It has also been proposed to use ammonium or amine salts of mineral acids as catalysts for the esterification of cellulose. Although such salts show some retarding effect on the degradation of the cellulose as compared to their corresponding free mineral acids, nevertheless, they still degrade the cellulose to a considerable extent, and they are highly corrosive to metals. Therefore, little is gained by employing such catalysts.

One object of this invention is to disclose catalysts which produce substantially undegraded and soluble cellulose esters from cellulose and acid anhydrides. A second object is to describe catalysts which will promote the reaction of cellulose with acid anhydrides to produce undegraded soluble derivatives within a reasonable length of reaction time, and without having any corrosive effect on metal equipment. A third object is to disclose a catalyst which will not chemically introduce strong acids groups into the cellulose molecule to interfere with the heat stability of the product. A fourth object is to describe catalysts which will perform all of these functions even when they are employed in truly catalytic amounts of 1–10% based on the weight of the cellulose. A fifth object is to disclose cellulose esterification catalysts which, due to their inert nature as regards to their effect on the heat stability of the cellulose, need not be washed out of the final product. A sixth object is to disclose catalysts which are capable of producing acetone-soluble cellulose esters directly without a back-hydrolysis step.

The objects of this invention are accomplished by catalyzing the esterification of cellulose with titanate salts, esters, alkoxides, and hydroxides. If titanate salts are employed, it is preferred not to use those salts which contain radicals of the strong mineral acids which are known to degrade cellulose. Examples of such salts are titanium chloride or sulfate. Rather, it is preferred to use titanium salts of weaker mineral acids or titanium salts of organic acids. Salts which have given satisfactory results are titanium oxalate, potassium titanium oxalate, titanium acetate, etc. Titanium esters and alkoxides which have been found to the operative are the various organometallic titanium catalysts which have been disclosed as ester interchange catalysts for synthetic polyester preparation (U.S. 2,720,502, J. R. Caldwell, October 11, 1955). Examples of such titanium compounds are as follows:

I. Titanium alkoxides Ti(OR)$_4$

II. Sodium titanium alkoxides

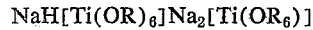

III. Titanium acylates 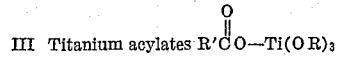

Normally in these products the R groups (Formulas I and II) are the lower alkyl radicals such as methyl, ethyl, propyl, or butyl radicals and the R' group in Formula III is stearate, oleate, and the like. Such compounds are discussed in the Du Pont bulletins (1953) entitled "Titanium Esters," "Titanium Acrylates," and "Titanium Organics."

Titanium hydroxide is another form in which the titanium catalysts may be employed. This compound may be prepared by slowly adding TiCl₄ to water and filtering off the precipitate which forms. Another procedure for making the hydroxide is to add ammonia to a water solution of a soluble titanium salt such as titanium potassium oxalate or titanium sulfate and filter off the hydroxide compound. If titanium hydroxide is used, the compound should not be dried by heating since titanium hydroxide may be converted to the insoluble inert form of TiO₂ in this manner. A simple procedure for removing the water from freshly precipitated Ti(OH)₄ is to wash the precipitate with a water miscible organic solvent.

The amount of titanium compound required to promote the esterification of cellulose with an organic acid anhydride depends on the percentage of titanium in the compound. For practical purposes it is desirable to use those active titanium compounds which contain the higher percentages of titanium such as Ti(OH)₄ or its low-molecular-weight alkoxides. It has been found that based on the weight of the cellulose, an amount of titanium tetrabutoxide as low as 1% is sufficient to produce an organic solvent soluble cellulose ester when cellulose is heated with an excess of anhydride, chosen from the group acetic, propionic, or butyric anhydride at 135° C. for 3–6 hr. This reaction time can be reduced to 1–3 hr. under the same reaction conditions if 5% titanium butoxide catalyst is employed.

In carrying out the esterification in the presence of a diluent, it is desirable to maintain a reaction temperature of 80–160° C. and to employ not less than a 0.5 molar excess of the theoretical amount of anhydride necessary to produce the triester. Any compatible diluent that does not destroy the activity of the reactants and which boils either at or above the desired reaction temperature can be used. Aliphatic acids, ethers, lactones, and substituted amides have been found to be satisfactory diluents. If desired, however, a large excess of the acid anhydride may serve as the diluent. If a fibrous esterification is desired, a diluent which is a solvent for the esterifying reagents but a nonsolvent for cellulose or the ester being formed may be employed. Aliphatic and aromatic hydrocarbons are examples of such diluents.

The discovery that a titanium salt, ester, alcoholate, or hydroxide is capable of catalyzing the reaction of cellulose with an acid anhydride is indeed novel for under the same reaction conditions similar esters and salts of other polyvalent metals were ineffective. For example, the following compounds did not promote the reaction of cellulose with acetic anhydride when the cellulose was heated with a large molar excess of the anhydride at the reflux temperature (136–137° C.) of the anhydride and in the presence of 10% of the metal compound:

Dibutyl tin diacetate
Isopropyl antimonate
Tetra ethyl silicate
Rare earth acetates
Calcium acetate
Barium acetate
Ferric acetate
Zinc acetate
Aluminum acetate
Aluminum isopropoxide
Zirconium acetate
Triamyl boron Why titanium is a catalyst for the esterification of cellulose while similar compounds are not is difficult to explain since some of these compounds, such as zirconium and the rare earth metals, are quite similar to titanium in their properties. One explanation could be that a small amount of the titanium ester of cellulose is formed in situ and is, in turn, replaced by the organic acid radical. This cycle is repeated until all of the hydroxyl groups of the cellulose have been esterified.

EXAMPLE 1

This example illustrates how an acetone-soluble, undegraded cellulose acetate can be prepared directly from cellulose and acetic anhydride by the use of a titanium alkoxide catalyst. It also shows a comparison of the products obtained with this catalyst and with sulfuric acid.

Thirty grams of "acetic acid activated" cotton linters was added to a flask equipped with a strong stirring device and a condenser and containing 400 grams of acetic anhydride. While the mixture was stirred continuously, 1.5 g. (5%, based on the weight of the cellulose) of titanium tetrabutoxide was added and heat was applied until the acetic anhydride started to boil. The mixture was stirred at the boiling point of the anhydride (136–137° C.) for one hour whereupon a clear viscouse solution formed. This solution was cooled to 30° C., diluted to twice its volume with acetic acid, and slowly stirred into 3 liters of water. The cellulose acetate precipitated as a fibrous material which was easily filtered off and washed with water until acid free. The properties of the dry product are listed in Table 1.

The esterification was repeated using 2% sulfuric acid (based on the weight of the cellulose) in place of the 5% titanium tetrabutoxide. After a reaction time of 20 minutes (136–137° C.) a clear, slightly viscous solution formed. The solution was cooled to 30° C. and processed in the manner described above. The properties of cellulose acetate which was obtained from this reaction are listed in Table 1.

Table 1.—Properties of cellulose acetates

| | H₂SO₄ Method | Ti(OC₄H₉)₄ Method |
|---|---|---|
| Solubility in acetone | insoluble | soluble. |
| Solubility in 9:1 methylene chloride methanol. | soluble | soluble. |
| Acetyl content | 44.10 | 40.05. |
| Intrinsic viscosity | 1.02 | 3.01. |
| Color | White | White. |
| Heat stability (190° C.) | Charred in 10 min. | Slightly yellow after 3 hr. |

EXAMPLE 2

This example illustrates how a diluent can be employed in the reaction. It also illustrates how titanium hydroxide can be employed.

Thirty grams of unactivated cotton linters were added to a flask equipped with a strong stirring device, and a condenser and containing 180 g. of n-butyric anhydride dissolved in 600 g. of dimethylformamide. While the mixture was stirred continuously, 0.9 (3%, based on the weight of the cellulose) of titanium hydroxide Ti(OH)₄ was added. The hydroxide was prepared by adding an excess of NH₄OH to potassium titanium oxalate, filtering off the precipitate and washing it with dimethylformamide until it was substantially free of the excess water.

The mixture was stirred at 145° C. for 2½ hours whereupon a clear viscous solution formed. This solution was cooled to 30° C. and poured into 3 liters of water. The precipitated cellulose butyrate was filtered off, washed, and dried. It was soluble in acetone and 9:1 methylene chloride-methanol. Analyses indicates the derivative contained 2.2 butyryl groups per glucose unit. It was thermally stable to a 3-hour heating test at 190° C. It had an intrinsic viscosity of 2.25.

EXAMPLE 3

The experiment described in Example 1 was repeated using potassium titanium oxalate as a catalyst. The catalyst was used at a concentration of 10% based on the weight of the cellulose. A clear solution was obtained after a heating period of 45 minutes at 135–137° C.

The cellulose acetate which was obtained was acetone-soluble and had an intrinsic viscosity of 2.82. It did not char when heated at 190° C. for 3 hours.

EXAMPLE 4

The experiment described in Example 1 was repeated using a sodium titanium butoxide catalyst at 6% concentration, based on the weight of the cellulose. A clear solution was obtained after a heating period of 1½ hr. at 135–137° C.

The cellulose acetate which was obtained was acetone-soluble and had an intrinsic viscosity of 2.35.

We claim:

1. A method of preparing lower fatty acid esters of cellulose which comprises esterifying cellulose with a lower fatty acid anhydride and 1–10%, based on the cellulose, of a catalyst selected from the group consisting of titanium salts, esters, alkoxides and hydroxides.

2. A method of preparing cellulose acetate which comprises esterifying cellulose with acetic anhydride and 1–10%, based on the cellulose, of titanium tetrabutoxide.

3. A method of preparing cellulose acetate which comprises esterifying cellulose with acetic anhydride and 1–10%, based on the cellulose, of potassium titanium oxalate.

4. A method of preparing cellulose acetate which comprises esterifying cellulose with acetic anhydride and 1–10%, based on the cellulose, of titanium hydroxide.

5. A method of preparing cellulose acetate which comprises esterifying cellulose with acetic anhydride and 1–10%, based on the cellulose, of sodium titanium butoxide.

References Cited in the file of this patent

UNITED STATES PATENTS 2,720,502    Caldwell _____ Oct. 11, 1955

OTHER REFERENCES

Ind. and Eng. Chem., vol. 50 (1958), pages 1061–1063.